United States Patent [19]
Roden et al.

[11] Patent Number: 5,647,057
[45] Date of Patent: Jul. 8, 1997

[54] MULTIPLE BLOCK TRANSFER MECHANISM

[75] Inventors: Philip A. Roden, Plano; Brian T. Deng, Richardson, both of Tex.

[73] Assignee: Texas Instruments Incorporated, Dallas, Tex.

[21] Appl. No.: 303,549

[22] Filed: Sep. 9, 1994

Related U.S. Application Data

[63] Continuation of Ser. No. 934,606, Aug. 24, 1992, abandoned.

[51] Int. Cl.$^6$ .................................................. G06F 13/38
[52] U.S. Cl. .................. 395/275; 364/940.81; 364/240.8
[58] Field of Search .................................. 395/200, 275, 395/425, 725, 775, 800

[56] References Cited

U.S. PATENT DOCUMENTS

| | | | |
|---|---|---|---|
| 4,060,849 | 11/1977 | Bienvenu | 364/DIG. 1 |
| 4,198,699 | 4/1980 | Caddell | 365/236 |
| 4,757,446 | 7/1988 | Trottier | 395/325 |
| 4,797,809 | 1/1989 | Sato | 395/425 |
| 5,237,670 | 8/1993 | Wakerly | 395/425 |

*Primary Examiner*—David Y. Eng
*Attorney, Agent, or Firm*—Thomas G. Eschweiler; James C. Kesterson; Richard L. Donaldson

[57] ABSTRACT

A block data transfer system may comprise a microprocessor integrated within a bus controller, a bus, and a plurality of computer boards coupled together via the bus. A PAL (programmable array logic device), integrated within the bus controller, allows an efficient block transfer of data between components on the computer boards by asserting a binary signal to indicate to the bus controller when to continue the data transfer and when to truncate the data transfer. The PAL utilizes a counter, dependent upon the data transfer size, to control the binary indication signal. The binary signal overrides the architectural data transfer protocol, thereby eliminating "protocol overhead" timing associated in multiple data transfers by allowing the entire data block to transfer within one transfer protocol period.

6 Claims, 2 Drawing Sheets

MULTIPLE BLOCK TRANSFER MECHANISM

This application is a continuation of application Ser. No. 07/934,606, filed Aug. 24, 1992, now abandoned.

FIELD OF THE INVENTION

This invention is in the field of electronic circuits and is more particularly related to system bus architectures.

BACKGROUND OF THE INVENTION

The design of bus architectures typically include a number of compromises to optimize performance parameters that may be inversely related to one another. Certain bus architecture standards are designed as open standards to provide a general framework, yet provide flexibility so that certain performance criteria may be enhanced for specific system applications. Futurebus+ is one such open standard. The Futurebus+ standard is an IEEE specification #896.1-1991 and is described in an article entitled "Futurebus+ Coming of Age" (Theus, John, "Futurebus+ Coming of Age", *Microprocessor Report*, May 27, 1992, pp. 17–22).

The Futurebus+ architecture standard allows two operating speeds, a fully compelled mode and a source synchronous packet mode. Packet mode, the highest speed of operation, requires a data length for data transfer no larger than 64 transfers. The number of bytes=transfer length×byte width. Each data transfer is governed by a protocol that mandates the data transfer have three distinct phases: an address phase (which includes the connecting to the bus and the address of the data), a data phase (which includes the transmission of the data from the source address to the destination address), and a disconnect phase (which includes the disconnection from the bus). Each phase of the protocol must be completed before another data transfer may take place. Due to local bus limitations, any block data transfer greater than the architectural standard of the local bus (in this embodiment the Hbus standard of 64 bytes) would be required to be split up into a plurality of block data transfers each of a size equal to the maximum amount permitted within the architectural standard. Therefore, any large block data transfer will be slowed by the extra time associated with the plurality of smaller block data transfers required to transfer the large block of data. Therefore, large data transfers proceed slowly since a large block of data must be broken into smaller sections and transferred separately.

Each data transfer must endure the transfer protocol of: address, data, and disconnect. "Protocol overhead" timing is the time that elapses during the address phase, data phase, and disconnection phase of each data transfer when attempting to transfer a large block of data. The "protocol overhead" timing suffered during block data transfers was anticipated by Futurebus+ architecture standard developers and a binary signal designated "MORE" was provided in the architectural scheme to deal with the "protocol overhead" timing issue. The "MORE" signal overrides the standard bus protocol and allows block data transfers greater than the maximum amount permitted within the local bus architectural standard to be transferred at one time. Therefore, the block data transfer would have only one address phase, one data phase, and one disconnect phase. The control of the "MORE" signal has been left to individual chip designers to manipulate as desired.

An obvious method of controlling the "MORE" signal within Futurebus+ architecture standards uses a direct memory access (DMA) controller to control the "MORE" signal to implement block data transfers. However, DMA controllers are highly complex circuit components that require significant die space when integrating onto bus controllers. They also increase system costs if a separate "DMA" controller chip is placed on a computer board. Therefore, other methods are needed to efficiently and inexpensively manipulate the "MORE" signal provided in the Futurebus+ architecture standard.

It is accordingly an object of the invention to efficiently and inexpensively control "protocol overhead" timing in bus structures. It is a further object of this invention to efficiently control the "MORE" signal in bus structures adopting the Futurebus+ architecture standard.

Other objects and advantages of the invention will become apparent to those of ordinary skill in the art having reference to the following specification together with the drawings herein.

SUMMARY

A block data transfer system comprises a microprocessor, a bus controller, a PAL (programmable array logic device), a system bus, and a plurality of computer boards coupled together via the system bus. The PAL, which may be integrated within the bus controller, allows an efficient block transfer of data between components on the plurality of computer boards by asserting a binary signal to indicate to the bus controller when to continue the data transfer and when to truncate the data transfer. The PAL utilizes a decoder and a counter to control the binary indication signal dependent upon the data transfer size. The binary signal overrides the local bus architectural data transfer standard protocol, thereby eliminating "protocol overhead" timing associated in multiple data transfers by allowing the entire data block to transfer within one transfer protocol period.

DETAILED DESCRIPTION OF THE PREFERRED EMBODIMENT

Figure 1:
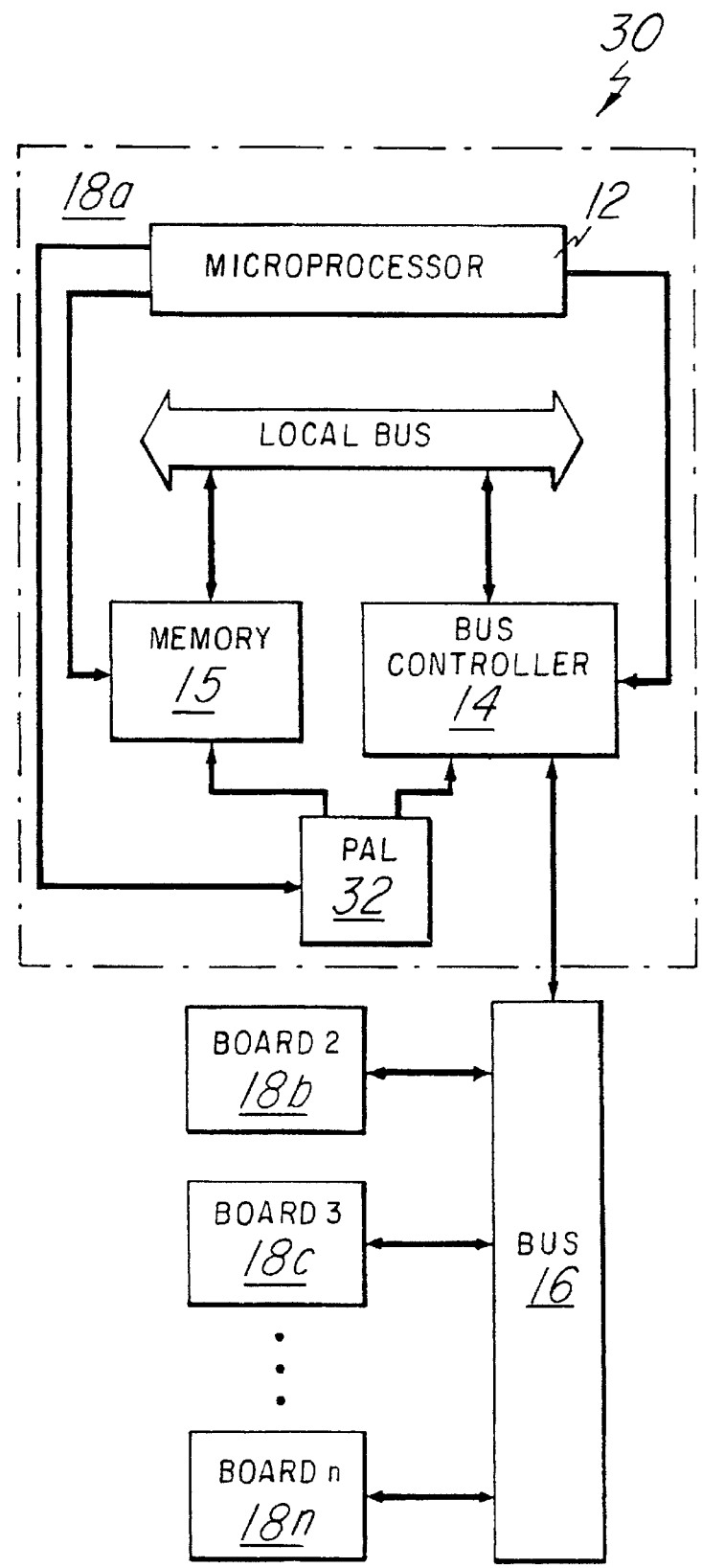
FIG. 1 is a system block drawing illustrating the preferred embodiment of the invention.

FIG. 1 is a block level bus architecture system 30 illustrating the preferred embodiment of the invention. A microprocessor 12 is connected to a bus controller 14, a memory device 15, and a programmable array logic (PAL) device 32. Bus controller 14 is also connected to memory device 15 and PAL 32. PAL 32 is also connected to memory device 15. Microprocessor 12, for example, may comprise an x486 microprocessor manufactured by Intel Corp., while bus controller 14 may comprise a TFB2002 currently being developed by Texas Instruments Inc. Additionally, PAL 32 may comprise a 22V10 and memory device 15 may comprise a 1 Mbit DRAM both manufactured by Texas Instruments Inc. Bus controller 14 is connected to bus 16 which is connected to a plurality of computer boards 18a–n. Computer boards 18a–n may have a plurality of memory chips and peripheral chips (I/O) on them. The plurality of memory chips and I/O chips may communicate with one another via the bus 16 and their bus controller 14. According to the preferred embodiment, PAL 32 is configured as a programmable counter in order to manipulate the "EXTENDED TRANSFER" signal such that bus controller 12 may manipulate the "MORE" signal provided within the Futurebus+ architecture standard. The manipulation of the "MORE" signal, as described in detail below, allows block data transfers greater than 64 bytes without suffering the "protocol overhead" timing of multiple address and disconnection phases.

System 30, of FIG. 1, may integrate microprocessor 12 and PAL 32 within bus controller 14 on a single semiconductor chip. Doing so improves system reliability and eliminates additional packaging costs while concurrently saving space on a computer board.

Figure 2:
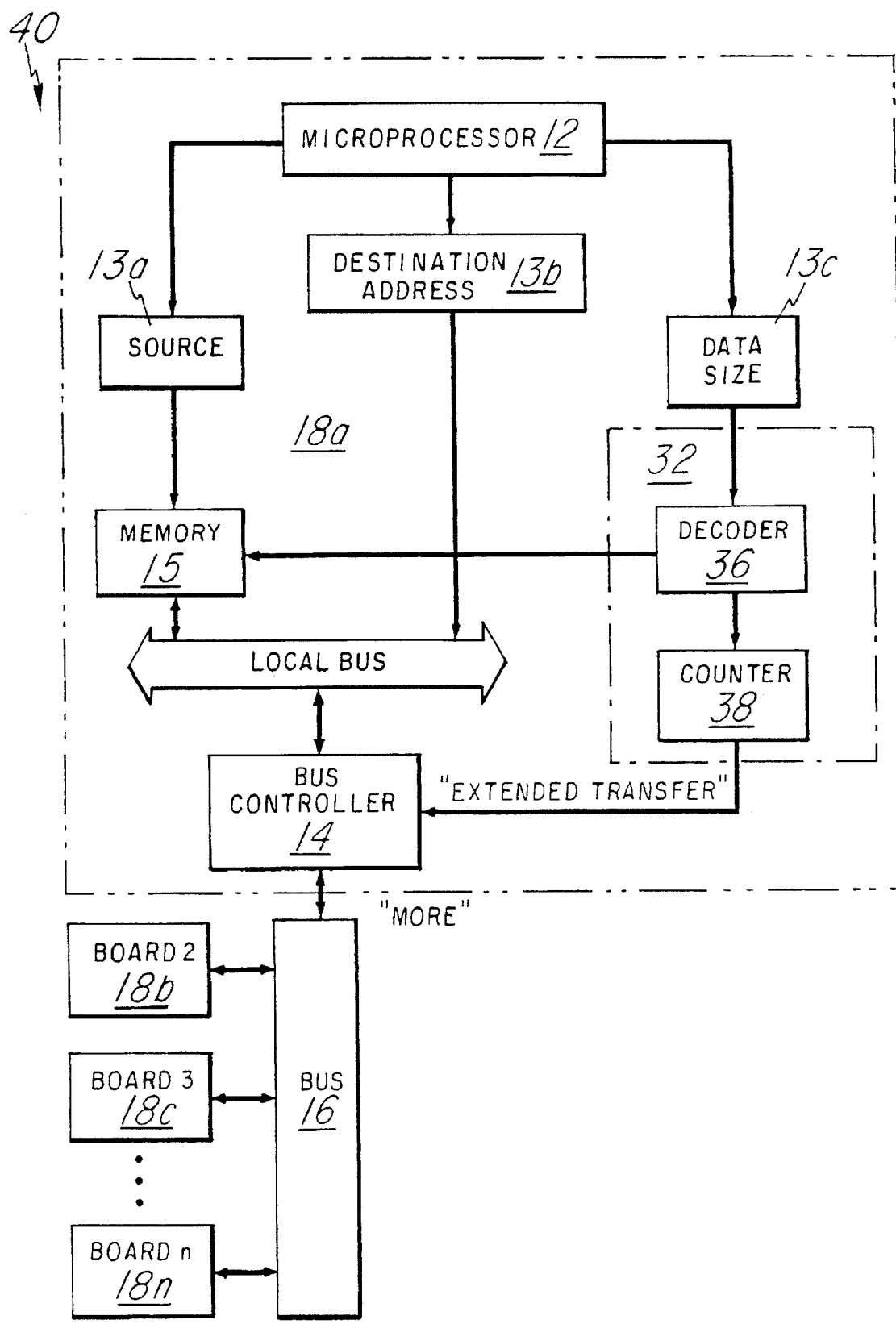
FIG. 2 is a block diagram illustrating in more detail the preferred embodiment of the invention.

FIG. 2 is a block level diagram 40, illustrating in greater detail, the preferred embodiment of the invention. Microprocessor 12, when requesting a block data transfer, outputs three distinct pieces of data: a source address 13a, a destination address 13b, and a data size 13c. Source address 13a is connected to a memory device 15 which holds the data for the data transfer and indicates where in memory 15 data should be retrieved. Data size 13c is connected to a decoder circuit 36 within PAL 32. PAL 32 includes both decoder circuit 36 and programmable counter 38. Decoder circuit 36 checks whether data size 13c requested by microprocessor 12 for transfer is greater than the maximum size allowed by the local bus architecture so that the novel mechanism of manipulating the "EXTENDED TRANSFER" signal is only utilized when it is needed. Counter 38 is connected to the output of decoder 36. The output of counter 38 representing the "EXTENDED TRANSFER" protocol timing signal is connected to bus 16.

With reference to FIG. 2, a detailed functional description of the invention is now provided. In FIG. 2, a block data transfer request is initiated in microprocessor 12 by software driving microprocessor 12. In response to the block data transfer request, microprocessor 12 outputs source address 13a, destination address 13b, and data size 13c. The output of this information coupled with the connection of bus controller 14 to bus 16 comprises the address phase of the Futurebus+ protocol. Source address 13a indicates the location in memory 15 where the data for the block data transfer resides. Destination address 13b is the location where the data for the block data transfer will go. Data may be any size and may transfer, for example, from a memory to a memory, a memory to an I/O device (input/output), an I/O device to a memory, or an I/O device to an I/O device. Source address 13a and destination address 13b may reside on different computer boards within computer system 40, however, source address 13a resides on the same board as microprocessor 12 that is mandating the data transfer during a write operation and destination address 13b resides on the same board as microprocessor 12 that is mandating the data transfer during a read operation. Data size 13c communicates the size of the data for the block data transfer. Decoder circuit 36 compares data size 13c to the maximum block data size allowable by the local bus architecture (which is 64 bytes in this particular embodiment). If data size 13c is greater than 64 bytes, decoder 36 enables counter 38. If data size 13c is less than or equal to 64 bytes, decoder 36 disables counter 38. The disabling of counter 38 when data size 13c is less than 64 bytes advantageously accommodates the local bus architecture which allows any block data transfer less than or equal to 64 bytes.

When data size 13c, requested by microprocessor 12, is greater than 64 bytes, decoder 36 enables counter 38. Decoder 36 decodes data size 13c by utilizing a "look-up" table to match data size 13c to a predetermined binary number. Data sizes larger than 64 bytes are assigned binary numbers which increase as the data size increases. The predetermined binary number associated with data size 13c becomes the output of decoder 36. Counter 38 takes the predetermined binary number, asserts the "EXTENDED TRANSFER" input to bus controller 14, and begins counting. Asserting the "EXTENDED TRANSFER" input signal to bus controller 14 causes bus controller 14 to assert a "MORE" signal to bus 16 and initiates the block data transfer. The block data transfer from source address 13a to destination address 13b comprises the data phase of the Futurebus+ protocol. Counter 38 stops counting when it reaches the predetermined binary number value and turns the "EXTENDED TRANSFER" input signal to bus controller 14 off which ends the assertion of the "MORE" signal to bus 16. Turning the "MORE" signal off disables data transfer along bus 16. Proceeding the block transfer is the disconnection phase of the Futurebus+ protocol where bus controller 14 is disconnected from bus 16.

An example of the performance improvement by practicing the invention is now described. The local bus architecture allows a maximum block data transfer of 64 bytes in length. Each 64 byte data transfer requires a complete transfer protocol of address phase ("X" nanoseconds), data phase ("Y" nanoseconds), and disconnect phase ("Z" nanoseconds). Therefore, a complete transfer protocol time, "$T_p$", is: $T_p=X+Y+Z$. For a 2 Kbyte data transfer, thirty-two (32) separate 64 byte transfers would be required, each with their corresponding protocol timing of "$T_p$" nanoseconds. Therefore, the total time, "$T_1$", needed for the 2 Kbyte data transfer would be 32×"$T_p$" nanoseconds. However, when utilizing the invention to manage the "EXTENDED TRANSFER" and therefore the "MORE" signal on Futurebus+, the Futurebus+ data transfer protocol is overridden and only one transfer protocol takes place. Therefore, the time, "$T_2$", required for a 2 Kbyte block data transfer requires only one address phase ("X" nanoseconds), one data phase (32×"Y" nanoseconds), and one disconnect phase ("Z" nanoseconds), thus greatly improving the speed of block data transfers. This is easily seen in the comparison of the equations for "$T_1$" and "$T_2$".

$$T_1=32(X+Y+Z) \, nS$$

$$T_2=X+32Y+Z \, nS$$

$$T_1-T_2=(\text{overhead protocol timing eliminated})=31X+31Z \, nS$$

The manipulation of the "EXTENDED TRANSFER" signal by use of PAL 32 is a simple, reliable, cost-effective solution in the reduction of "protocol overhead" timing in large block data transfers.

Although the invention has been described with reference to the preferred embodiment herein, this description is not to be construed in a limiting sense. Various modifications of the disclosed embodiment will become apparent to persons skilled in the art upon reference to the description of the invention. It is therefore contemplated that the appended claims will cover any such modifications or embodiments as fall within the true scope of the invention.

What is claimed is:

1. A data transfer system, comprising:

a bus, wherein the bus carries data back and forth to a plurality of circuit boards connected to the bus and conforms to a Futurebus+ architecture standard;

a microprocessor on a circuit board, the circuit board being coupled to the bus, and wherein the microprocessor outputs a source address, a destination address, and a data size to indicate the present data location, size, and desired future data location;

a programmable array logic device coupled to the microprocessor, wherein the programmable array logic device receives the data size information from the microprocessor and enables an "EXTENDED TRANSFER" signal to bus controller for block data transfer in the event the data size exceeds a predetermined amount and disables the "EXTENDED TRANSFER" signal to bus controller after completion of block data transfer and wherein the programmable logic device comprises:

a decoder coupled to outputs of the microprocessor, wherein the decoder receives data size information from the microprocessor and maps the data size to a predetermined binary value to be used in enabling and disabling the bus controller for block data transfer initiation and termination; and a counter coupled to the decoder and to the bus, wherein the counter receives the binary value from the decoder, enables the bus controller for block data transfer, overrides the bus architecture protocol, and begins counting to the binary value, at which time, when the binary value has been reached, the counter disables the bus controller and the block data transfer is terminated; and the bus controller, on a circuit board, connected to the bus, the bus controller being enabled by the "EXTENDED TRANSFER" signal of the programmable array logic device for block data transfer between the plurality of circuit boards asserts a "MORE" signal to the bus to transfer block data greater in size than allowed by the Futurebus+ architecture protocol standard, and disabling the "MORE" signal after the block data transfer has been completed thereby overriding the Futurebus+ architecture protocol standard of the bus and eliminating protocol overhead timing associated with multiple block transfers.

2. The improved data transfer system of claim 1 wherein the microprocessor outputs a source address, a destination address, and a data size to indicate the present data location, size, and desired future data location.

3. A data transfer system, comprising:

a bus, wherein the bus carries data back and forth to a plurality of circuit boards connected to the bus and conforms to a Futurebus+ architecture standard;

means for making data transfer requests on a circuit board connected to the bus, wherein the means for making data transfer requests outputs a source address, a destination address, and a data size to indicate the present data location, size, and desired future data location;

timing means on a circuit board, wherein the timing means receives the data size information from the microprocessor and enables a means for bus control with an "EXTENDED TRANSFER" signal for block data transfer in the event the data size exceeds a predetermined amount and disables the "EXTENDED TRANSFER" signal to the means for bus control after completion of block data transfer, wherein the timing means comprises:

a decoder circuit, wherein the decoder receives data size information from the microprocessor and maps the data size to a predetermined binary value to be used in enabling and disabling the bus controller for block data transfer initiation and termination; and a counter circuit connected to the decoder circuit, wherein the counter receives the binary value from the decoder, enables the bus controller for block data transfer, overrides the bus architecture protocol, and begins counting to the binary value, at which time, when the binary value has been reached, the counter disables the bus controller and the block data transfer is terminated; and the means for bus control on a circuit board coupled to the timing means wherein the timing means causes the bus control means to assert a "MORE" signal to the bus in response to the "EXTENDED TRANSFER" signal, thus allowing a data transfer larger than the Futurebus+ architecture protocol standard and wherein the timing means disables the bus control means after the data transfer is complete thereby eliminating protocol overhead timing associated with multiple block transfers.

4. The data transfer system of claim 3 wherein means for making data transfer requests comprises a microprocessor.

5. The data transfer system of claim 3 wherein means for making data transfer requests comprises a direct memory access controller.

6. The data transfer system of claim 3 wherein the means for bus control comprises a bus controller.

\* \* \* \* \*